(12) United States Patent
Liu et al.

(10) Patent No.: US 12,025,888 B2
(45) Date of Patent: Jul. 2, 2024

(54) LIQUID CRYSTAL DISPLAY PANEL, LIQUID CRYSTAL ALIGNMENT METHOD, AND MOBILE TERMINAL

(71) Applicant: SHENZHEN CHINA STAR OPTOELECTRONICS SEMICONDUCTOR DISPLAY TECHNOLOGY CO., LTD., Guangdong (CN)

(72) Inventors: Jinming Liu, Guangdong (CN); Yoonsung Um, Guangdong (CN); Juncheng Xiao, Guangdong (CN); Ji Li, Guangdong (CN); Yun Yu, Guangdong (CN); Xiaojin He, Guangdong (CN); Qi Zhang, Guangdong (CN); Chunxiao Hu, Guangdong (CN)

(73) Assignee: SHENZHEN CHINA STAR OPTOELECTRONICS SEMICONDUCTOR DISPLAY TECHNOLOGY CO., LTD., Guangdong (CN)

(*) Notice: Subject to any disclaimer, the term of this patent is extended or adjusted under 35 U.S.C. 154(b) by 282 days.

(21) Appl. No.: 17/600,015

(22) PCT Filed: Aug. 26, 2021

(86) PCT No.: PCT/CN2021/114645
§ 371 (c)(1),
(2) Date: Sep. 29, 2021

(87) PCT Pub. No.: WO2023/019622
PCT Pub. Date: Feb. 23, 2023

(65) Prior Publication Data
US 2023/0057818 A1 Feb. 23, 2023

(30) Foreign Application Priority Data

Aug. 19, 2021 (CN) .......................... 202110964643.8

(51) Int. Cl.
*G02F 1/1343* (2006.01)
*G02F 1/1337* (2006.01)

(52) U.S. Cl.
CPC .. *G02F 1/134336* (2013.01); *G02F 1/133707* (2013.01); *G02F 1/13439* (2013.01)

(58) Field of Classification Search
CPC ......... G02F 1/134336; G02F 1/133707; G02F 1/13439
See application file for complete search history.

(56) References Cited

U.S. PATENT DOCUMENTS

2001/0055379 A1* 12/2001 Mamiya ................ H04M 3/493
379/201.05
2011/0149220 A1 6/2011 Byun et al.
(Continued)

FOREIGN PATENT DOCUMENTS

CN 1564962 A 1/2005
CN 101740581 A 6/2010
(Continued)

*Primary Examiner* — Lucy P Chien
(74) *Attorney, Agent, or Firm* — HSML P.C.

(57) ABSTRACT

A liquid crystal display panel, a liquid crystal alignment method and a mobile terminal are provided. In a liquid crystal alignment process, an electrode layer receives an alignment voltage, and a pretilt angle of a liquid crystal molecule arranged corresponding to a branch electrode is less than a pretilt angle of a liquid crystal molecule arranged corresponding to a slit. Because an overall pretilt angle of liquid crystal molecules in a liquid crystal layer is increased and pretilt angles in a same domain of a subpixel are (Continued)

differentiated, a response time and viewing angle features of medium and low grayscale of the liquid crystal display panel can be improved.

20 Claims, 5 Drawing Sheets

(56) References Cited

U.S. PATENT DOCUMENTS

2011/0317104 A1* 12/2011 Nakamura ............ G02F 1/1339
   257/E33.012
2011/0317118 A1* 12/2011 Okazaki ................ G02F 1/1393
   349/141

FOREIGN PATENT DOCUMENTS

| | | |
|---|---|---|
| CN | 101872098 A | 10/2010 |
| CN | 101923251 A | 12/2010 |
| CN | 102692770 A | 9/2012 |
| CN | 102854673 A | 1/2013 |
| CN | 104777671 A | 7/2015 |
| CN | 107942591 A | 4/2018 |
| CN | 108121116 A | 6/2018 |
| CN | 108845463 A | 11/2018 |
| CN | 111208676 A | 5/2020 |
| JP | 2002148629 A | 5/2002 |

* cited by examiner

LIQUID CRYSTAL DISPLAY PANEL, LIQUID CRYSTAL ALIGNMENT METHOD, AND MOBILE TERMINAL

BACKGROUND

Technical Field

The present invention relates to the field of display technologies, and in particular, to a liquid crystal display panel, a liquid crystal alignment method, and a mobile terminal.

Related Art

A large-size thin film transistor liquid crystal display (TFT-LCD) is currently the mainstream technology used in TVs. With the continuous improvement of information technologies and living standards, people have increasingly high requirements for display quality such as a response time and a view angle. In addition, compared to an in-plane switching liquid crystal display (IPS-LCD) and an organic light-emitting diode display (OLI)), a vertical alignment liquid crystal display (VA-LCD) has a poor viewing angle. Therefore, the improvement of the viewing angle has always been the focus of VA-LCD researchers. According to a transmissive liquid crystal alignment principle and a driving scheme, if the viewing angle is to be improved, a pixel needs to be divided into a plurality of domains, but this may cause a transmittance loss. Under a same pixel structure condition, a liquid crystal pretilt angle is one of the important factors affecting the response time and the viewing angle. Therefore, a solution of differentiating liquid crystal pretilt angles needs to be developed, thereby significantly improving the display quality.

Figure 1A:
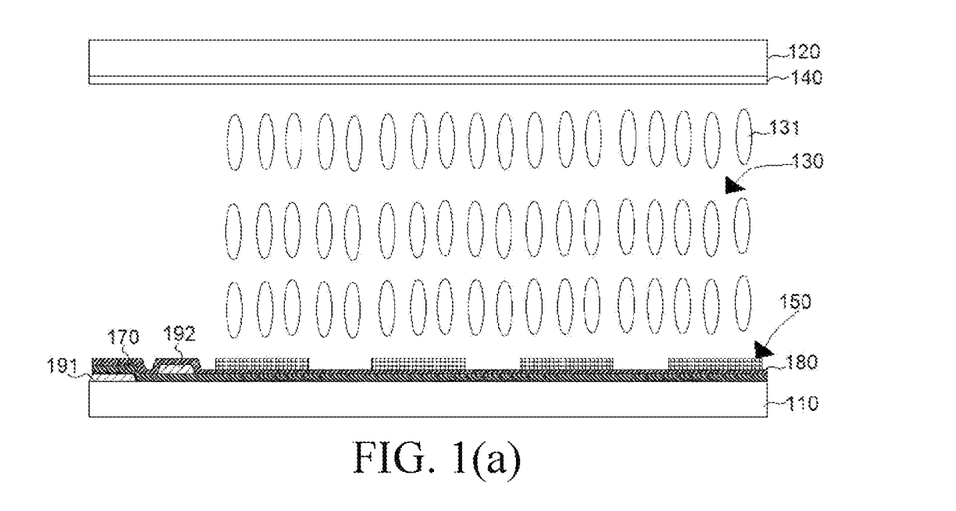
FIG. 1(a) is a cross-sectional view of a liquid crystal display panel before liquid crystal alignment.
Figure 1B:
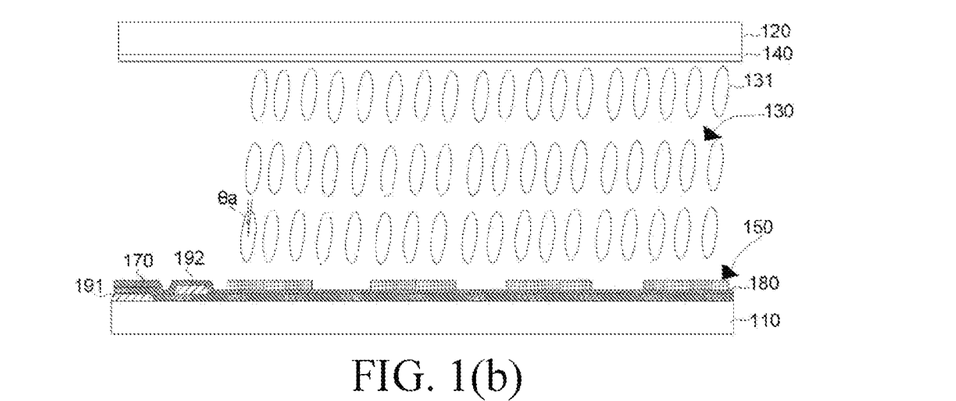
FIG. 1(b) is a cross-sectional view of a liquid crystal display panel after liquid crystal alignment is completed.
Figure 1C:
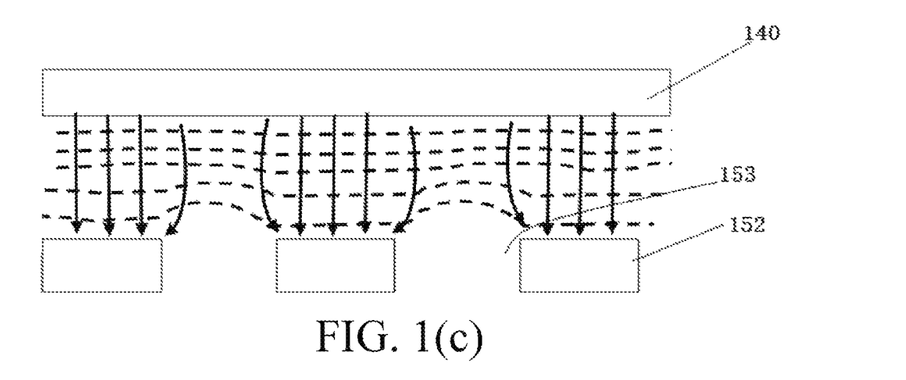
FIG. 1(c) is a schematic diagram of an electric field strength between a branch electrode and a common electrode and an electric field strength between a slit and the common electrode in a same domain region of a subpixel of a pixel layer in a liquid crystal alignment process of the existing liquid crystal display panel.
Figure 2:
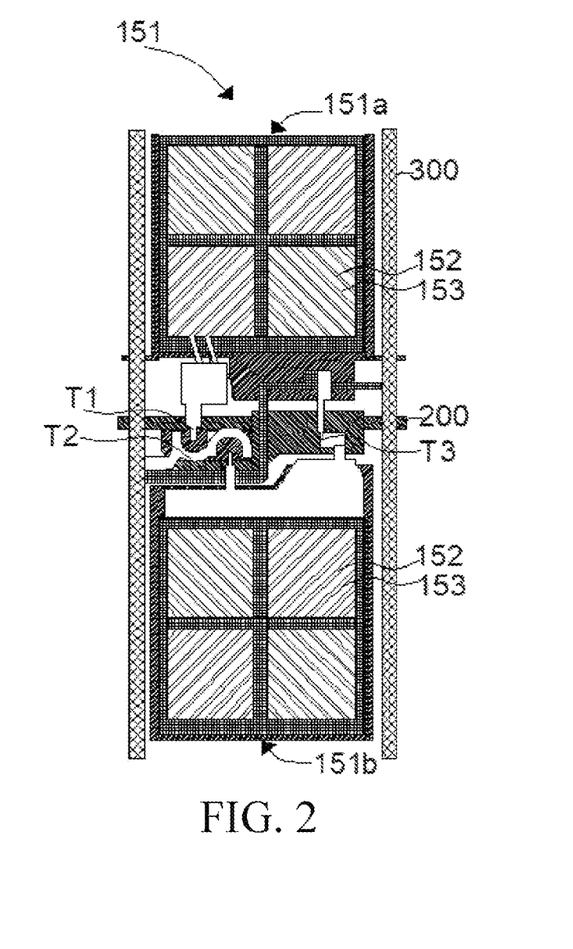
FIG. 2 is a schematic structural diagram of a subpixel of a pixel layer.

The principle of the conventional high vertical alignment (HVA) alignment technology and the liquid crystal penetration features are shown in FIG. 1(a) to FI. 1(c), where FIG. 1(a) is a cross-sectional view of a liquid crystal display panel before alignment, FIG. 1(b) is a cross-sectional view of a liquid crystal display panel after alignment is completed, and FIG. 1(c) is a schematic diagram of an electric field strength between a branch electrode and a common electrode and an electric field strength between a slit and a common electrode in a pixel layer in an alignment process. FIG. 2 is a schematic structural diagram of a subpixel of a pixel layer. In an alignment process, a common electrode 140 receives an alignment voltage, and a direction of an electric field is directed from the common electrode 140 to a pixel layer 150. As can be seen in FIG. 1(c), because there is little difference between an electric field strength bet-ween a branch electrode 152 and the common electrode 140 and an electric field strength between a slit 153 and the common electrode 140 in a same domain of a subpixel 151 of the pixel layer 150, for example, when the electric field strength between the branch electrode 152 and the common electrode 140 is an electric field strength formed under a voltage of 17 V, in this case, the electric field strength between the slit 153 and the common electrode 140 may reach an electric field strength formed under a voltage of 16 V. In this way, in a liquid crystal layer 130, a pretilt angle formed by a liquid crystal molecule 131 corresponding to the branch electrode 152 and a pretilt angle formed by a liquid crystal molecule 131 corresponding to the slit 153 are basically the same. Referring to FIG. 1(b), a pretilt angle $\theta_a$ of a liquid crystal molecule 131 is about 1.4°. Consequently, in an actual driving process, because there is no difference between the pretilt angle of the liquid crystal molecule 131 corresponding to the branch electrode 152 and the pretilt angle of the liquid crystal molecule 131 corresponding to the slit 153 in a same domain region of the subpixel 151, a low grayscale view angle of the panel is relatively single.

Technical Problem

Embodiments of the present application provide a liquid crystal display panel, a liquid crystal alignment method, and a mobile terminal, so as to resolve the problem of the poor low grayscale view angle of the conventional liquid crystal display panel.

SUMMARY

An embodiment of the present application provides a liquid crystal display panel, including: a first substrate and a second substrate arranged opposite to each other; a liquid crystal layer, including a plurality of liquid crystal molecules, arranged between the first substrate and the second substrate; a common electrode, arranged on one side of the second substrate facing the first substrate; and a pixel layer, arranged on one side of the first substrate facing the second substrate, where the pixel layer includes a plurality of subpixels arranged in an array, each of the subpixels includes at least two branch electrodes arranged in parallel, and a slit is formed between the two branch electrodes. The liquid crystal display panel further includes: an electrode layer, arranged between the first substrate and the pixel layer, and spaced apart from the pixel layer, where a pretilt angle of a liquid crystal molecule arranged corresponding to the branch electrode is less than a pretilt angle of a liquid crystal molecule arranged corresponding to the slit.

Further, a gate insulating layer and a protective layer are arranged between the electrode layer and the pixel layer in a stacking manner, and the pixel layer is arranged on the protective layer.

Further, the electrode layer is an ITO electrode layer.

Further, a spacing between the common electrode and the pixel layer is in a range of 3.2-3.3 μm.

Further, the electrode layer is arranged on the first substrate, a first array common electrode is further arranged on the first substrate, and the first array common electrode and the electrode layer are arranged in a same layer.

An embodiment of the present application further provides a liquid crystal alignment method, including:
  providing the liquid crystal display panel as described above;
  applying an alignment voltage to the electrode layer to form an alignment electric field between the electrode layer and the common electrode, causing the liquid crystal molecules in the liquid crystal layer to deflect, where a pretilt angle formed by a liquid crystal molecule arranged corresponding to the branch electrode of the pixel layer is less than a pretilt angle formed by a liquid crystal molecule arranged corresponding to the slit; and
  irradiating the liquid crystal display panel with ultraviolet light to fix the liquid crystal molecules at the pretilt angles.

Further, an electric field strength between the branch electrode and the common electrode is lower than an electric field strength between the slit and the common electrode.

Further, a voltage value of the alignment voltage is in a range of 50-100 V.

Further, absolute values of differences between azimuth angles of liquid crystal molecules at edge positions of opposite sides of the branch electrode and an azimuth angle of a liquid crystal molecule at a central position of the branch electrode are equal.

Further, during actual driving after alignment is completed, a driving voltage is applied to the common electrode, and the azimuth angles of the liquid crystal molecules at the edge positions of the opposite sides of the branch electrode are the same as the azimuth angle of the liquid crystal molecule at the central position of the branch electrode, or the absolute values of the differences between the azimuth angles of the liquid crystal molecules at the edge positions of the opposite sides of the branch electrode and the azimuth angle of the liquid crystal molecule at the central position of the branch electrode are less than or equal to 1.

An embodiment of the present application further provides a mobile terminal, where the mobile terminal includes a terminal body and the liquid crystal display panel mentioned above.

Beneficial Effects

The beneficial effects of the present application are as follows: An electrode layer is arranged on one side of a first substrate facing a second substrate, and an alignment voltage is applied to the electrode layer in a liquid crystal alignment process, so that in a same domain region of a subpixel, there is a difference between a pretilt angle of a liquid crystal molecule in a liquid crystal layer corresponding to a branch electrode and a pretilt angle of a liquid crystal molecule in a liquid crystal layer corresponding to a slit, and the difference is obvious. Therefore, in an actual driving process of a liquid crystal display panel, because an overall pretilt angle of liquid crystal molecules is increased and pretilt angles in a same domain are differentiated, a response time and viewing angle features of medium and low grayscale of the liquid crystal display panel can be improved.

BRIEF DESCRIPTION OF THE DRAWINGS

The following describes specific implementations of this application in detail with reference to the accompanying drawings, to make the technical solutions and other beneficial effects of this application obvious.

The component numbers in the figures are as follows.

100. liquid crystal display panel, 110. first substrate, 120. second substrate, 130. liquid crystal layer, 131. liquid crystal molecule, 131a. liquid crystal molecule region arranged corresponding to branch electrode, 131b. liquid crystal molecule region arranged corresponding to slit, 140. common electrode, 150. pixel layer, 151. subpixel, 151a. main region, 151b. secondary region, 152. branch electrode, 153. slit, 160. electrode layer, 170. gate insulating layer, 180. protective layer, 191. first array common electrode, 192. second array of common electrode; 200. scan line; and 300. data line.

DETAILED DESCRIPTION

The following clearly and completely describes the technical solutions in the embodiments of the present invention with reference to the accompanying drawings in the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

In a liquid crystal display panel, an electrode layer (ITO electrode layer) is added on a first substrate, and an alignment voltage is applied to the electrode layer in a liquid crystal alignment process, so that in a same domain region of a subpixel, there is a difference between a pretilt angle of a liquid crystal molecule in a liquid crystal layer corresponding to a branch electrode and a pretilt angle of a liquid crystal molecule in a liquid crystal layer corresponding to a slit. Therefore, a response time and view angle features of medium and low grayscale of the liquid crystal display panel can be improved. As a typical application, the liquid crystal display panel may be applied to a mobile terminal, such as a TFT-LCD mobile terminal with a VA-LCD panel, that is, the liquid crystal display panel is a VA-LCD panel, and the mobile terminal is a TFT-LCD display.

Figure 3:
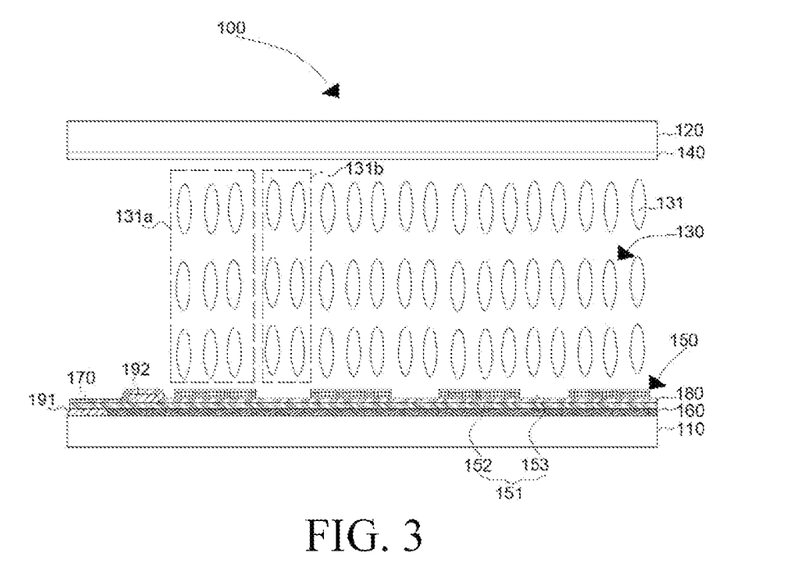
FIG. 3 is a cross-sectional view of a liquid crystal display panel before liquid crystal alignment according to an exemplary embodiment of the present invention.
Figure 4:
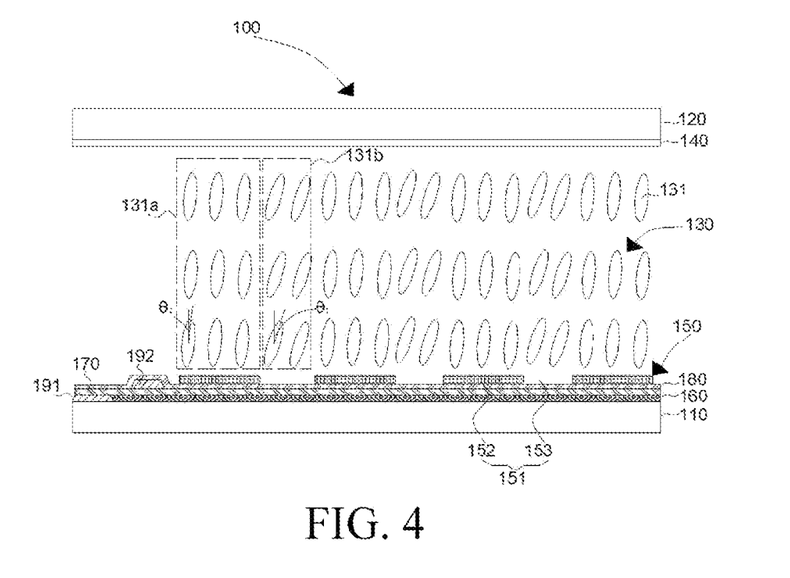
FIG. 4 is a cross-sectional view of a liquid crystal display panel after liquid crystal alignment is completed according to an exemplary embodiment of the present invention.

Referring to FIG. 3 and FIG. 4, in an embodiment of the present invention, a liquid crystal display panel 100 includes a first substrate 110, a second substrate 120, a liquid crystal layer 130, a common electrode 140, a pixel layer 150, and an electrode layer 160. The first substrate 110 and the second substrate 120 are arranged opposite to each other, and the liquid crystal layer 130 includes a plurality of liquid crystal molecules 131. The electrode layer 160 is arranged on one side of the first substrate 110 facing the second substrate 120, and a gate insulating layer 170 (GI layer) and a protective layer 180 (PV layer) are arranged between the electrode layer 160 and the pixel layer 150 in a stacking manner. The pixel layer 150 is arranged on one side of the protective layer 180 away from the gate insulating layer 170, a second array common electrode 192 (M2) is arranged between the protective layer 180 and the gate insulating layer 170, a first array common electrode 191 (M1) is arranged at one end of the electrode layer 160, and the electrode layer 160 and the first array common electrode 191 are arranged in a same layer. The pixel layer 150 includes a plurality of subpixels 151 arranged in an array. For a structure of the subpixels 151, refer to FIG. 2. The structure of the subpixels 151 in this embodiment takes a 3T_8 domain structure as an example, but is not limited to the 3T_8 domain structure. A 4-domain structure may also be used, and quantities of thin film transistors and capacitors in a pixel structure are not limited. For example, for 2TIC or 3TIC, each subpixel 151 includes a main region 151a and a secondary region 151b. In a pixel array, a scan line 200 is arranged between two adjacent rows of subpixels, and a data line 300 is arranged between two adjacent rows of subpixels. Each of the subpixels 151 further includes: a main region thin film transistor T1, a secondary region thin film transistor T2, and a shared thin film transistor T3. A gate of the main region thin film transistor T1 is connected to the scan line 200, a source of the main region thin film transistor T1 is connected to the data line 300, and a drain of the main region thin film transistor T1 is connected to a main region pixel electrode (not shown in the figure) in the main region 151a. A gate of the secondary region thin film transistor T2 is connected, to the scan line 200, a source of the secondary region thin film transistor T2 is connected to the data line 300, and a drain of the secondary region thin film transistor T2 is connected to a secondary region pixel electrode (not shown in the figure) in the secondary region 151b. A gate of the shared thin film transistor T3 is connected to the scan line 200, a source of the shared thin film transistor T3 is connected to the main region pixel electrode, and a drain of the shared thin film transistor T3 is connected to the secondary region pixel electrode. The main region pixel electrode and the secondary region pixel electrode form a pixel electrode of the subpixels 151.

The main region pixel electrode is divided into 4 domains, each domain includes a plurality of branch electrodes 152 arranged in parallel and spaced apart, and a slit 153 is formed between two adjacent branch electrodes 152. A secondary region storage electrode is divided into 4 domains, each domain includes a plurality of the branch electrodes 152 arranged in parallel and spaced apart, and a slit 153 is formed between two adjacent branch electrodes 152. A region at which the branch electrode 152 is located is a line region, and a region at which the slit 153 is located is a space region. A pretilt angle of a liquid crystal molecule 131 arranged corresponding to the branch electrode 152 is less than a pretilt angle of a liquid crystal molecule 131 arranged corresponding to the slit 153.

In this embodiment, the slit 153 includes a region between two adjacent branch electrodes 152 in one subpixel 151. As an improvement, the slit 153 may further include a region between two adjacent subpixels 151, specifically, a region between adjacent pixel electrodes of two adjacent subpixels 151.

In this embodiment, one electrode layer 160 corresponds to an entire pixel array in the pixel layer 150. As a preferred manner of the present invention, the electrode layer 160 includes a plurality of electrode sublayers (not shown in the figure) arranged in sequence, and one electrode sublayer corresponds to some of the subpixels 151 in the pixel array. In this embodiment, the first substrate 110 is an array substrate, and a common electrode arranged on the array substrate is an array common electrode. The array common electrode includes a first array common electrode 191 and a second array common electrode 192, and the array common electrode on the array substrate is configured to transmit a voltage signal and a control signal. The second substrate 120 is a color filter substrate, and the common electrode 140 arranged on the second substrate 120 may also be referred to as a color filter common electrode (Cf common electrode).

Figure 5:
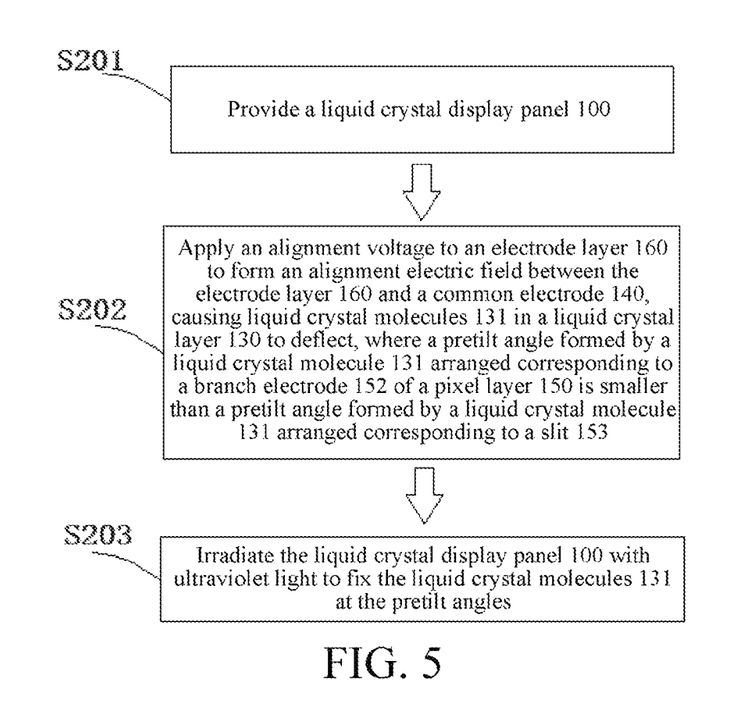
FIG. 5 is a flowchart of a liquid crystal alignment method according to an exemplary embodiment of the present invention.

In this embodiment, referring to FIG. 5, a liquid crystal alignment method is as follows.

S201. Provide a liquid crystal display panel 100.

S202. Apply an alignment voltage to an electrode layer 160 to form an alignment electric field between the electrode layer 160 and a common electrode 140, causing liquid crystal molecules 131 in a liquid crystal layer 130 to deflect, where a pretilt angle formed by a liquid crystal molecule 131 arranged corresponding to a branch electrode 152 of a pixel layer 150 is less than a pretilt angle formed by a liquid crystal molecule 131 arranged corresponding to a slit 153.

S203. Irradiate the liquid crystal display panel 100 with ultraviolet light to fix the liquid crystal molecules 131 at the pretilt angles.

Specifically, a first alignment film layer (not shown in the figure) may be arranged on one side of the pixel layer 150 facing the second substrate 120, and a second alignment film layer (not shown in the figure) may be arranged on one side of the common electrode 140 facing the first substrate 110.

The ultraviolet light is irradiated by means of an ultraviolet main curing (UVM) machine. In step S203, the liquid crystal display panel 100 is transported to the JVM machine, and the UVM machine exposes the liquid crystal display panel 100 to ultraviolet rays. The first alignment film layer and the second alignment film layer interact with the liquid crystal molecules under the irradiation of the ultraviolet rays, thereby maintaining fixed pretilt angles of the liquid crystal molecules, and completing a liquid crystal alignment process of the liquid crystal display panel 100.

In the liquid crystal alignment process, an alignment voltage is applied to the electrode layer 160 (ITO electrode layer), and the alignment voltage is a high voltage. In this embodiment, the alignment voltage is set to 50 V, and a voltage, for example, 4 V, may be applied to the pixel layer 150 according to actual needs, to adjust an alignment electric field. No voltage is applied to the common electrode 140 (that is, the voltage on the common electrode 140 is 0 V), and the electrode layer 160 receives the alignment voltage. Due to a voltage difference, an electric field is formed between the electrode layer 160 and the common electrode 140, and a direction of the electric field is directed from the electrode layer 160 to the common electrode 140 (Cf common electrode).

In the liquid crystal alignment process, when the electrode layer 160 receives the alignment voltage and forms the electric field with the common electrode 140, due to a blocking or shielding effect of the branch electrode 152, an electric field strength between the branch electrode 152 and the common electrode 140 is weakened (for example, an electric field strength generated by a voltage difference of about 10 V). Because there is no branch electrode 152 or other electrodes in the slit 153, an electric field strength between the slit 153 and the common electrode 140 is normal (for example, an electric field strength generated by a voltage difference of about 17 V, and is greater than the electric field strength between the branch electrode 152 and the common electrode 140. That is, when the electrode layer 160 receives a high voltage (for example, 50 V), the electric field strength between the slit 153 and the common electrode 140 is significantly higher than the electric field strength between the branch electrode 152 and the common electrode 140. Therefore, a pretilt angle $\theta_2$ formed by a liquid crystal molecule 131 in a liquid crystal molecule region 131a arranged corresponding to the branch electrode is significantly lower than a pretilt angle $\theta_1$ formed by a liquid crystal molecule in a liquid crystal molecule region 131b arranged corresponding to the slit. That is, a pretilt angle of a liquid crystal molecule corresponding to the line region and a pretilt angle of a liquid crystal molecule corresponding to the space region are differentiated. In this embodiment, the pretilt angle $\theta_2$ formed by the liquid crystal molecule 131 in the liquid crystal molecule region 131a arranged corresponding to the branch electrode is 0.4°, the pretilt angle $\theta_1$ formed by the liquid crystal molecule 131 in the liquid crystal molecule region 131b arranged corresponding to the silt is 2.4°, and a difference between $\theta_1$ and $\theta_2$ is 2.0°. Compared to that all pretilt angles $\theta_a$ of the liquid crystal molecules in the existing liquid crystal display panel are 1.4°, in this embodiment, an overall pretilt angle is increased and pretilt angles are differentiated. Further, in an actual driving process of the liquid crystal display panel 100, due to the overall increase and diversification of the pretilt angles, a response time and view angle features of medium and low grayscale of the liquid crystal display panel 100 can be improved.

Degrees such as 0.4°, 2.0°, and 1.4° of the pretilt angle, are all exemplary degrees in this embodiment and are not fixed values. A specific degree of the pretilt angle may be determined according to actual needs.

The electric field strength may vary with a magnitude of the alignment voltage applied to the electrode layer 160, to adjust magnitudes of $\theta_1$ and $\theta_2$, and adjust the difference between $\theta_1$ and $\theta_2$. That is, a differentiation range of pretilt angles of liquid crystal molecules between the line region and the space region can be adjusted according to actual user requirements. A spacing between the common electrode 140 and the pixel layer 150 is set to range from 3.2 to 3.3 μm, which can ensure the electric field strength.

In this embodiment, applying a high voltage to the electrode layer 160 in the liquid crystal alignment process can reduce a pretilt angle formed by the liquid crystal molecule 131 in the liquid crystal molecule region 131a arranged corresponding to the branch electrode, and increase a pretilt angle formed by the liquid crystal molecule 131 in the liquid crystal molecule region 131b arranged corresponding to the slit. After post-processing steps such as retreat and UV light irradiation, the pretilt angle formed by the liquid crystal molecule 131 in the liquid crystal molecule region 131a arranged corresponding to the branch electrode is fixed at $\theta_2$ (0.4° in this embodiment), and the pretilt angle formed by the liquid crystal molecule 131 in the liquid crystal molecule region 131b arranged corresponding to the slit is fixed at $\theta_1$ (2.4° in this embodiment).

In the actual driving process of the liquid crystal display panel 100, a voltage is applied to the common electrode 140, and the common electrode 140 receives a driving voltage (the same as an actual driving manner of the existing liquid crystal display panel). The electrode layer 160 does not receive a voltage (that is, a voltage on the electrode layer 160 is 0 V), and a voltage on the pixel layer 150 is about 8 V.

In addition, a relationship of a transmittance with an azimuth angle φ and a tilt angle θ is shown in the following equation:

$$T=1/2*\sin^2(2\varphi)*\sin^2(f(\theta))$$

Figure 6:
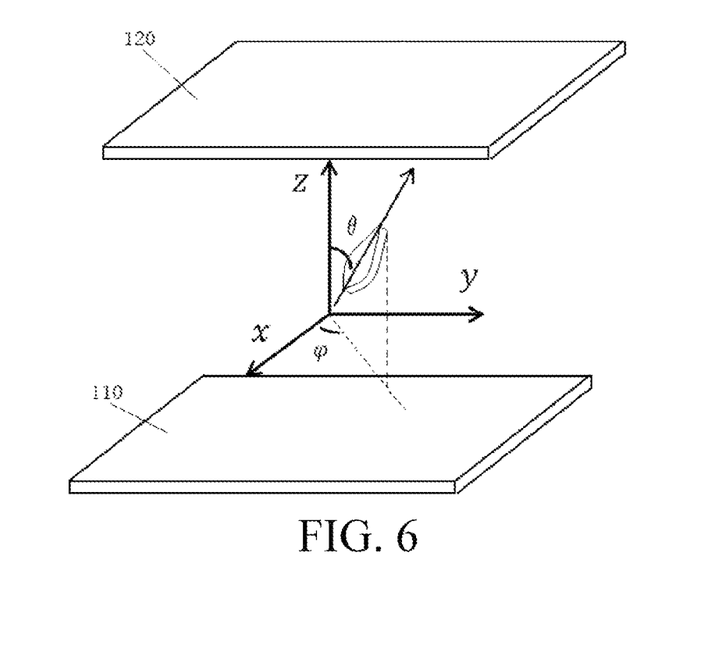
FIG. 6 is a schematic diagram of a first substrate, a second substrate, a pretilt angle of a liquid crystal molecule, and an azimuth angle of a liquid crystal molecule.
Figure 7:
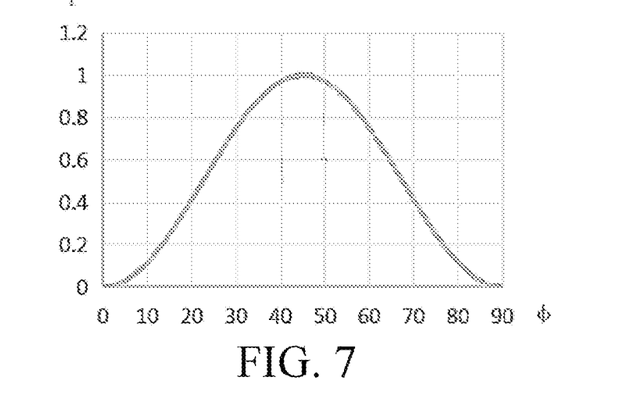
FIG. 7 is a schematic diagram of a relational curve between an azimuth angle and a transmittance.

With reference to the relational expression and referring to FIG. 6 and FIG. 7, when the pretilt angle θ is fixed, the transmittance T is the largest when the azimuth angle φ is 45° (in this case, a major axis of the liquid crystal molecule 131 is parallel to a lengthwise direction of the branch electrode 152), and a brightness of the liquid crystal display panel 100 is the highest; and when q is 35° or 55°, T is reduced, and the brightness of the liquid crystal display panel 100 is relatively reduced, Referring to FIG. 6, the azimuth angle (R is an angle between an x-axis and an orthographic projection line of the major axis of the liquid crystal molecule 131 on one side of the first substrate 110 facing the second substrate 120, and the pretilt angle θ is an angle between the major axis of the liquid crystal molecule 131 and a z-axis (that is, a vertical direction).

For the conventional liquid crystal display panel, referring to FIG. 1(a) and FIG. 1(b), in the liquid crystal alignment process, the common electrode 140 receives an alignment voltage, and a direction of the electric field is directed from the common electrode 140 to the pixel layer 150. After the liquid crystal alignment is completed, pretilt angles $\theta_a$ of liquid crystal molecules 131 in the liquid crystal layer 130 are the same, and are all 1.4°, that is, the pretilt angle $\theta_a$ is fixed. In an actual driving process of the liquid crystal display panel, a driving voltage is also applied to the common electrode 140, and a direction of a driving electric field is also directed from the common electrode 140 to the pixel layer 150 (the same direction as the electric field). Therefore, azimuth angles of liquid crystal molecules at edge regions of the driving electric field corresponding to the existing liquid crystal display panel do not change. Generally, because electric field strengths at the edge regions are lower than an electric field strength at a central region, azimuth angles Q of the liquid crystal molecules corresponding to the edge regions are not 45°, and may deflect. That is, the azimuth angles q of the liquid crystal molecules at the edge regions may be 350 or 55°, which reduces the transmittance T and the brightness of the edge regions of the existing liquid crystal display panel.

In this embodiment of the present invention, in the liquid crystal alignment process, the electrode layer 160 receives an alignment voltage, and a direction of the electric field (that is, the alignment electric field) is directed from the electrode layer 160 to the common electrode 140. After the liquid crystal alignment is completed, the pretilt angle θ is fixed (for example, in this embodiment, $\theta_1$ is 2.4° and $\theta_2$ is 0.4°). In this case, due to the effect of the alignment electric field formed by the alignment voltage, electric field strengths of edge regions (that is, regions near two sides of the first substrate 110 in FIG. 3) are lower than an electric field strength of a central region of the electric field. Therefore, the azimuth angles w of the liquid crystal molecules corresponding to the edge regions of the electric field are not 45°, but may be 35° or 55°.

Figure 8:
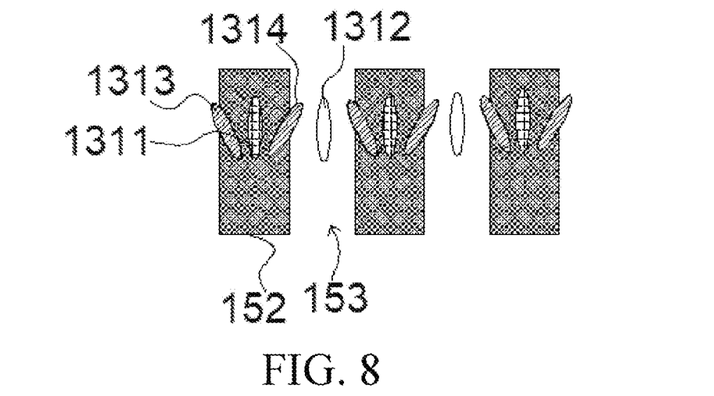
FIG. 8 is a schematic diagram of azimuth angles of liquid crystal molecules on a liquid crystal display panel after liquid crystal alignment is completed according to an exemplary embodiment of the present invention.

Referring to FIG. 8, in this embodiment, the liquid crystal molecules 131 at edge positions on opposite sides of the branch electrode 152 are a liquid crystal molecule 1313 (an azimuth angle is 55°) and a liquid crystal molecule 1314 (an azimuth angle is 35°), the liquid crystal molecule 131 at a central position of the branch electrode 152 is a liquid crystal molecule 1311 (an azimuth angle is 450), and the liquid crystal molecule 131 corresponding to the slit 153 is a liquid crystal molecule 1312. A difference between the azimuth angle of the liquid crystal molecule 1313 and the azimuth angle of the liquid crystal molecule 1311 is 55°−45°=10°, and a difference between the azimuth angle of the liquid crystal molecule 1314 and the azimuth angle of the liquid crystal molecule 1311 is 35°−45°=−10°. Absolute values of 10° and −10° are both 10°, that is, the absolute values are equal.

In an actual driving process of the liquid crystal display panel 100, a driving voltage is applied to the common electrode 140, and a direction of the electric field (that is, the driving electric field) is directed from the common electrode 140 to the pixel layer 150, and is opposite to a direction of the alignment electric field. Due to the effect of the driving electric field, a force opposite to that in a previous liquid crystal alignment process is applied to the liquid crystal molecules at the edge regions of the driving electric field, thereby correcting the azimuth angles (R of the liquid crystal molecules at the edge regions of the driving electric field. Therefore, the azimuth angles φ of the liquid crystal molecules at the edge regions of the driving electric field are close to 45°, that is, the direction of the major axis of the liquid crystal molecules 131 at the edge regions of the driving electric field is parallel to or approximately parallel to the branch electrode 152 (or a lengthwise direction of the line region). Therefore, in the actual driving process, azimuth angles Q of all the liquid crystal molecules 131 in the liquid crystal layer 130 are approximately equal to 45°.

Figure 9:
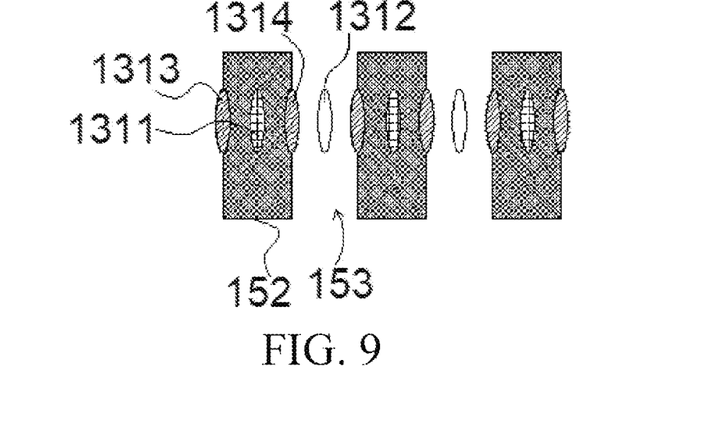
FIG. 9 is a schematic diagram of azimuth angles of liquid crystal molecules during actual driving of a liquid crystal display panel according to an exemplary embodiment of the present invention.

In this embodiment, referring to FIG. 9, in an actual driving process, the azimuth angles φ of the liquid crystal molecule 1313 and the liquid crystal molecule 1314 are both 450, that is, a difference between the azimuth angle φ of the liquid crystal molecule 1313 and the azimuth angle φ of the liquid crystal molecule 1311 is 0, and a difference between the azimuth angle φ of the liquid crystal molecule 1314 and the azimuth angle φ of the liquid crystal molecule 1311 is 0; or an absolute value of a difference between the azimuth angle φ of the liquid crystal molecule 1313 and the azimuth angle φ of the liquid crystal molecule 1311 is less than or equal to 1, and an absolute value of a difference between the azimuth angle φ of the liquid crystal molecule 1314 and the azimuth angle φ of the liquid crystal molecule 1311 is less than or equal to 1. For example, the azimuth angle of the liquid crystal molecule 1313 is 46°, and the azimuth angle of the liquid crystal molecule 1314 is 44°, both being close to 45°. In this way, a difference between a liquid crystal penetration contribution of a slit region and the space region is small, so that the transmittance T of the liquid crystal display panel 100 is at or close to the maximum. Compared to the existing liquid crystal display panel, the overall transmittance T can be improved, so that the brightness of the liquid crystal display panel 100 is higher and more uniform.

In conclusion, the present disclosure has been disclosed above through preferred embodiments. However, the preferred embodiments are not intended to limit the present disclosure, and a person of ordinary skill in the art can make various modifications and improvements without departing from the spirit and scope of the present disclosure. Therefore, the protection scope of the present disclosure should be subject to the scope defined by the claims.

What is claimed is:

1. A liquid crystal display panel, comprising:
a first substrate and a second substrate arranged opposite to each other;
a liquid crystal layer comprising a plurality of liquid crystal molecules, and the liquid crystal layer arranged between the first substrate and the second substrate;
a common electrode arranged on one side of the second substrate facing the first substrate;
a pixel layer arranged on one side of the first substrate facing the second substrate, wherein the pixel layer comprises a plurality of subpixels arranged in an array, each of the subpixels comprises at least two branch electrodes arranged in parallel, and a slit is defined between the two branch electrodes; and
an electrode layer arranged between the first substrate and the pixel layer, the electrode layer spaced apart from the pixel layer,
wherein a pretilt angle of a liquid crystal molecule arranged corresponding to the branch electrode is less than a pretilt angle of a liquid crystal molecule arranged corresponding to the slit,
wherein during alignment of the liquid crystal molecules, an alignment electric field is oriented from the electrode layer to the common electrode.

2. The liquid crystal display panel according to claim 1, wherein a gate insulating layer and a protective layer are arranged between the electrode layer and the pixel layer in a stacking manner, and the pixel layer is arranged on the protective layer.

3. The liquid crystal display panel according to claim 1, wherein the electrode layer is an indium tin oxide (ITO) electrode layer.

4. The liquid crystal display panel according to claim 1, wherein a spacing between the common electrode and the pixel layer ranges from 3.2 to 3.3 μm.

5. The liquid crystal display panel according to claim 1, wherein the electrode layer is arranged on the first substrate, a first array common electrode is further arranged on the first substrate, and the first array common electrode and the electrode layer are arranged in a same layer.

6. A liquid crystal alignment method, comprising:
providing a liquid crystal display panel, wherein the liquid crystal display panel comprises a first substrate and a second substrate arranged opposite to each other; a liquid crystal layer, comprising a plurality of liquid crystal molecules, and arranged between the first substrate and the second substrate; a common electrode, arranged on one side of the second substrate facing the first substrate; a pixel layer, arranged on one side of the first substrate facing the second substrate, wherein the pixel layer comprises a plurality of subpixels arranged in an array, each of the subpixels comprises at least two branch electrodes arranged in parallel, and a slit is formed between the two branch electrodes; and an electrode layer, arranged between the first substrate and the pixel layer, and spaced apart from the pixel layer;
applying an alignment voltage to the electrode layer to form an alignment electric field between the electrode layer and the common electrode, causing the liquid crystal molecules in the liquid crystal layer to deflect, wherein a pretilt angle formed by a liquid crystal molecule arranged corresponding to the branch electrode of the pixel layer is less than a pretilt angle formed by a liquid crystal molecule arranged corresponding to the slit; and
irradiating the liquid crystal display panel with ultraviolet light to fix the liquid crystal molecules at the pretilt angles.

7. The liquid crystal alignment method according to claim 6, wherein an electric field strength between the branch electrode and the common electrode is less than an electric field strength between the slit and the common electrode.

8. The liquid crystal alignment method according to claim 6, wherein a voltage value of the alignment voltage ranges from 50 to 100 V.

9. The liquid crystal alignment method according to claim 6, wherein absolute values of differences between azimuth angles of liquid crystal molecules at edge positions of opposite sides of the branch electrode and an azimuth angle of a liquid crystal molecule at a central position of the branch electrode are equal.

10. The liquid crystal alignment method according to claim 9, wherein during actual driving after alignment is completed, a driving voltage is applied to the common electrode, and the azimuth angles of the liquid crystal molecules at the edge positions of the opposite sides of the branch electrode are the same as the azimuth angle of the liquid crystal molecule at the central position of the branch electrode.

11. The liquid crystal alignment method according to claim 9, wherein during actual driving after alignment is completed, the absolute values of the differences between the azimuth angles of the liquid crystal molecules at the edge positions of the opposite sides of the branch electrode and the azimuth angle of the liquid crystal molecule at the central position of the branch electrode are less than or equal to 1.

12. The liquid crystal alignment method according to claim 6, wherein a gate insulating layer and a protective layer are arranged between the electrode layer and the pixel layer in a stacking manner, and the pixel layer is arranged on the protective layer.

13. The liquid crystal alignment method according to claim 6, wherein the electrode layer is an indium tin oxide (ITO) electrode layer.

14. The liquid crystal alignment method according to claim 6, wherein a spacing between the common electrode and the pixel layer ranges from 3.2 to 3.3 μm.

15. The liquid crystal alignment method according to claim 6, wherein the electrode layer is arranged on the first substrate, a first array common electrode is arranged on the first substrate, and the first array common electrode and the electrode layer are arranged in a same layer.

16. A mobile terminal, wherein the mobile terminal comprises a terminal body and a liquid crystal display panel, wherein the liquid crystal display panel comprises:

a first substrate and a second substrate arranged opposite to each other;

a liquid crystal layer, comprising a plurality of liquid crystal molecules, and arranged between the first substrate and the second substrate;

a common electrode, arranged on one side of the second substrate facing the first substrate;

a pixel layer, arranged on one side of the first substrate facing the second substrate, wherein the pixel layer comprises a plurality of subpixels arranged in an array, each of the subpixels comprises at least two branch electrodes arranged in parallel, and a slit is defined between the two branch electrodes; and an electrode layer arranged between the first substrate and the pixel layer, the electrode layer spaced apart from the pixel layer, wherein a pretilt angle of a liquid crystal molecule arranged corresponding to the branch electrode is less than a pretilt angle of a liquid crystal molecule arranged corresponding to the slit, wherein during alignment of the liquid crystal molecules, an alignment electric field is oriented from the electrode layer to the common electrode.

17. The mobile terminal according to claim 16, wherein a gate insulating layer and a protective layer are arranged between the electrode layer and the pixel layer in a stacking manner, and the pixel layer is arranged on the protective layer.

18. The mobile terminal according to claim 16, wherein the electrode layer is an indium tin oxide (ITO) electrode layer.

19. The mobile terminal according to claim 16, wherein a spacing between the common electrode and the pixel layer ranges from 3.2 to 3.3 μm.

20. The mobile terminal according to claim 16, wherein the electrode layer is arranged on the first substrate, a first array common electrode is arranged on the first substrate, and the first array common electrode and the electrode layer are arranged in a same layer.

\* \* \* \* \*